Oct. 10, 1933.  E. G. BUSSE  1,929,621
BRAKE BEAM SUPPORT
Filed May 2, 1932  3 Sheets-Sheet 1
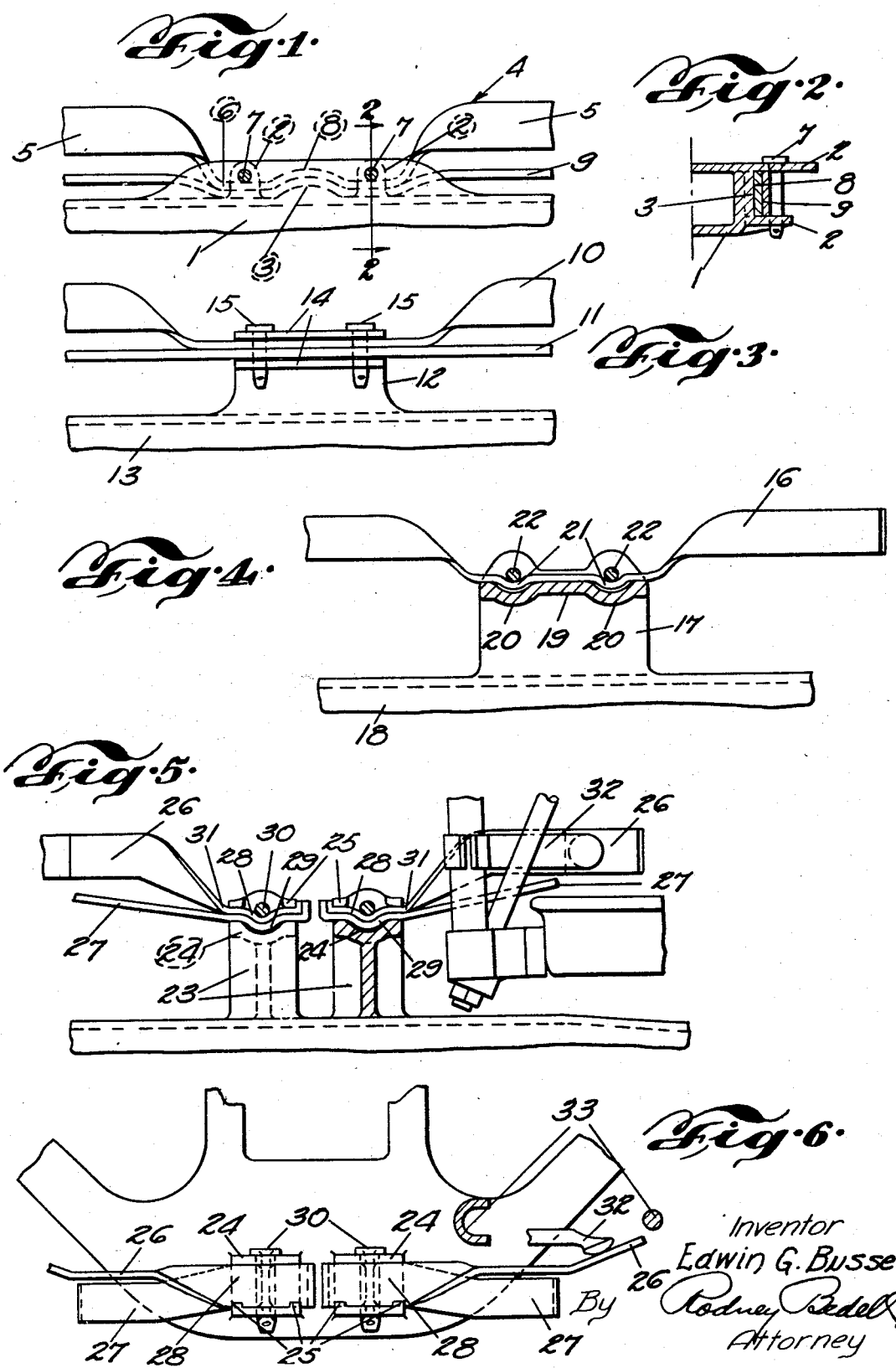

Oct. 10, 1933.  E. G. BUSSE  1,929,621
BRAKE BEAM SUPPORT
Filed May 2, 1932  3 Sheets-Sheet 2
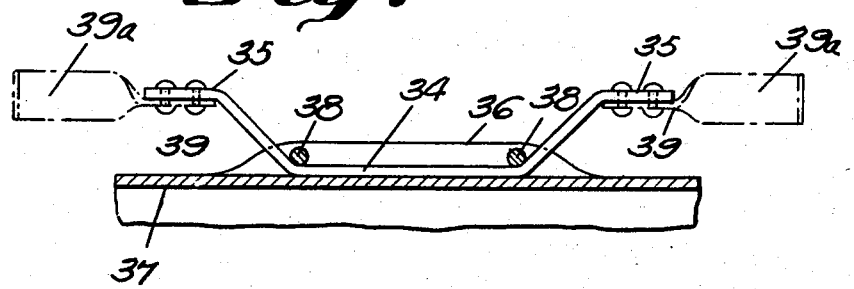
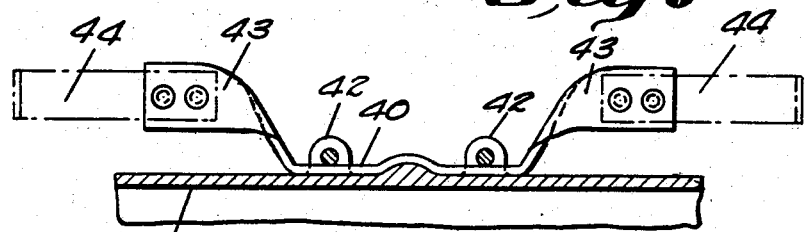
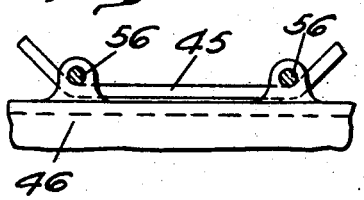
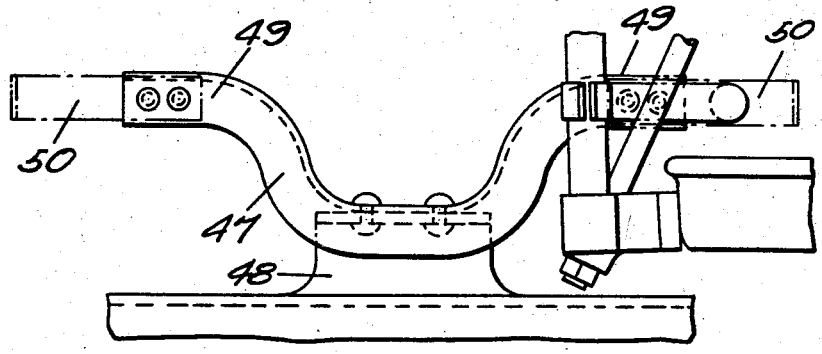
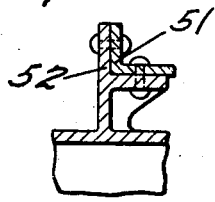
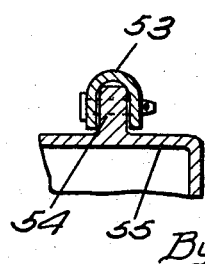
Inventor
Edwin G Busse
By Rodney Redell
Attorney Oct. 10, 1933.  E. G. BUSSE  1,929,621
BRAKE BEAM SUPPORT
Filed May 2, 1932   3 Sheets-Sheet 3
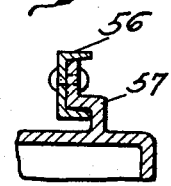
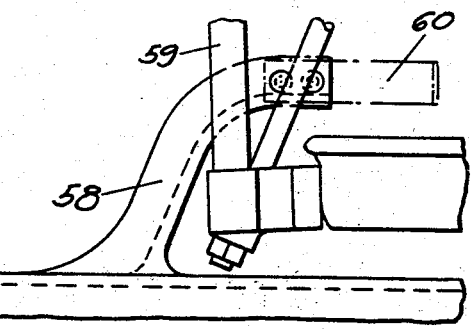
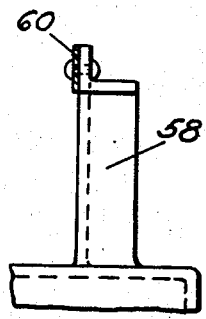
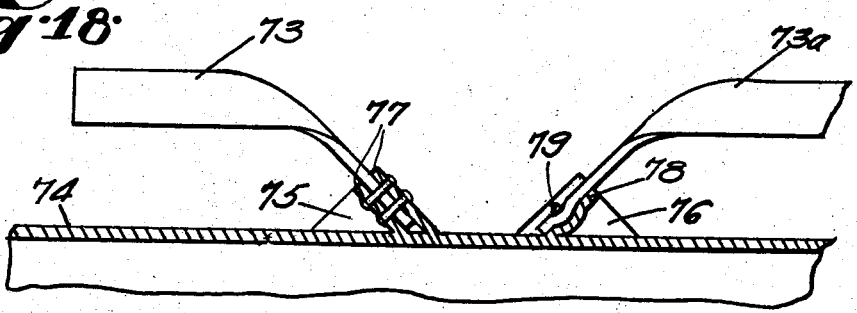
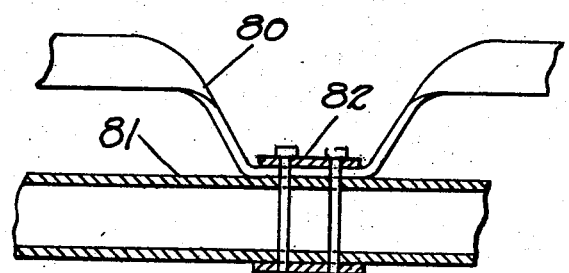
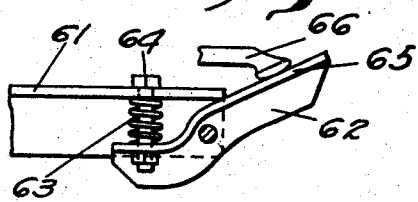
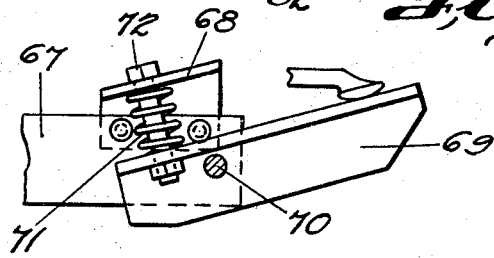
Inventor
Edwin G. Busse
By Rodney Bedell
Attorney Patented Oct. 10, 1933

1,929,621

UNITED STATES PATENT OFFICE 1,929,621

BRAKE BEAM SUPPORT

Edwin G. Busse, Chicago, Ill., assignor to Chicago Railway Equipment Company, Chicago, Ill., a corporation of Illinois Application May 2, 1932. Serial No. 608,759

13 Claims. (Cl. 188—210)

This invention relates to railway rolling stock and consists in a novel guard, guide or support device for brake beams.

Where the truck spring plank is eliminated, it is desirable to mount the brake beam supporting member directly on the truck side frame. However, such a member must be positioned a substantial distance inwardly of the side frame and the addition of a long inward arm on the frame to properly position the support materially increases the cost and weight of the truck and the arm is subject to damage due to vibration and due to impact of obstacles on the track especially under derailment conditions.

Co-pending application, Serial No. 562,540, filed September 12, 1931, illustrates a fourth point brake beam support comprising a strap having a central portion secured to the truck side frame and having inwardly offset end portions underlying the brake beam, the strap being bent edgewise and being vertically resilient throughout its length. However, the bending of the strap as disclosed, in a direction paralleling the broader surfaces of the strap, is a difficult proposition and the extent of offset is limited.

One object of the present invention is to facilitate offsetting the brake beam guard, guide or support strap by attaching one portion of the strap to the side frame with its broader surfaces disposed vertically and by twisting the strap 90 degrees between its attaching portion and the brake beam supporting portion.

Another object is to strengthen the brake beam support by providing a guard, guide or support member having a vertically rigid portion for attachment to the side frame and a vertically resilient end portion for underlying the beam.

These objects and others are attained by the structures illustrated in the accompanying drawings, in which—

Figure 1 is a top view of one form of the invention.

Figure 2 is a vertical transverse section taken on the line 2—2 of Figure 1.

Figures 3, 10 and 14 are top views of modified forms of the invention.

Figures 4, 5, 7, 8 and 9 are top views, partially in section, illustrating other modifications.

Figure 6 is an inside view of the form shown in Figure 5.

Figures 11, 12 and 13 are detail vertical transverse sections illustrating various methods of attachment of the brake beam support to a side frame bracket.

Figure 15 is an end view of the form shown in Figure 14, the flexible end of the support member being sectioned.

Figures 16 and 17 are detail side views partly in section illustrating still other modifications.

Figures 18 and 19 are horizontal sections showing other modifications.

In Figures 1 and 2, the truck side frame 1 is provided with spaced lugs 2 and a bulge 3 between the same. The guard, guide or support strap, indicated generally at 4, has substantially horizontally disposed end portions 5 positioned to underlie the brake beam and has an intermediate portion 6 twisted 90 degrees relative to the end portions and secured between lugs 2 by pins 7. The intermediate portion of the strap is curved centrally at 8 to receive the frame bulge 3, the strap being slightly distorted in assembling with the frame in order to prevent rattling. The strap is preferably made of material which is resilient in a direction perpendicular to its broader surfaces, and substantially rigid in a direction paralleling its broader surfaces. The strap is of sufficient strength so that the end portions 5 will properly support the brake beam.

An additional safety strap 9 is inserted between the lugs 2 and extends along the guard, guide or support strap 4. This additional safety guard is preferably vertically rigid throughout its length and supplements strap 4 after the latter has been depressed a certain distance.

In Figure 3, a bracket 12, projecting inwardly from the truck side frame 13, has a U-shaped inner portion 14 for receiving the twisted guard, guide or support strap 10 and the vertically rigid safety guard 11. Strap 10 and safety guard 11 are secured between the legs of portion 14 by means of pins 15.

In Figure 4, the twisted resilient guard, guide or support strap 16 is mounted upon a bracket 17 on the side frame 18 and the additional safety guard is eliminated. The bracket 17 has an upright inner wall 19 having pockets 20 within which depressions 21 in the vertically disposed central portion of the strap 16 are pressed by the pins 22.

In Figures 5 and 6, a pair of arms 23 project inwardly from the side frame, each having a pocket forming upright wall 24 and spaced end lugs 25. A twisted resilient guard, guide or support strap 26 and a vertically rigid safety guard 27 have vertically disposed end portions inserted between wall 24 and lugs 25 of each arm, the strap and safety guard having concentric depressions 28 and 29, respectively, pressed against wall 24 by a pin 30. The vertically disposed portions of each strap 26 are bent, as at 31, so as to position the vertically resilient end portion of the strap beneath chair 32 on the brake beam 33.

In Figure 7, a strap 34, having its broader surfaces disposed vertically and having inwardly offset end portions 35, is secured within lugs 36 on the truck side frame 37 by means of pins 38. At each end of strap 34 a twisted brake beam engaging member has a vertically disposed portion 39 riveted to portions 35 and has a horizontally disposed portion 39a for yieldingly supporting the brake beam.

In Figure 8, the intermediate member 40 has a vertically rigid central portion pinned to lugs 42 on the side frame 41 in a manner similar to that illustrated in Figure 1 and has inwardly offset twisted end portions 43 to which are riveted plates 44 for engaging the brake beam. In this form, the members 44 may be of rigid material in which case the brake beam support may derive its resiliency from the twisted end portions 43, or the member 40 may be rigid throughout its length and the end straps 44 could be made of resilient material.

The arrangement shown in Figure 9 eliminates the bulge intermediate the pins 56 which directly engage the bent portions of the guard, guide or support strap 45.

In Figure 10, the support device comprises a vertically rigid intermediate portion 47 of angle section secured to a bracket 48 on the truck side frame and having inwardly offset end portions 49 to which are riveted resilient straps 50 disposed to support the brake beams.

In Figures 11, 12 and 13, intermediate rigid members of various shapes, functioning similar to member 47 in Figure 10, are illustrated as mounted upon suitably shaped cooperating side frame brackets. In Figure 11, member 51 and the supporting bracket 52 are of angle shape. In Figure 12, the inverted U-shaped member 53 is pinned to an upright projection 54 on a side frame bracket 55. In Figure 13, the member 56 is of channel section and is riveted to an angular side frame bracket 57.

In Figures 14 and 15, a single arm 58 of angle section projects inwardly from the side frame, adjacent each brake beam 59, and at the end mounts a resilient strap 60 for supporting the brake beam through a chair, as shown in Figure 10.

In Figure 16, the guard, guide or support device has a vertically rigid portion 61 secured to the truck side frame (not shown), which portion corresponds to the rigid intermediate portions illustrated particularly in Figures 10 to 15. A bar 62 of angular section is pinned to the end of member 61 and is yieldingly maintained in position by a spring 63 which is held in position by a bolt 64. Bar 62 has a top flange 65 for engaging the brake beam chair 66.

In Figure 17, vertically rigid member 67 is similar to the intermediate member 34, shown in Figure 7, and is provided with an upwardly projecting angular bracket 68. A brake beam engaging bar 69 is pinned to member 67 at 70 and is resiliently held against rotation in a clockwise direction by a spring 71, counterclockwise rotation being prevented by bolt 72, as in Figure 16.

In Figure 18, each brake beam is supported by a separate resilient strap as in Figures 5 and 6, but the straps 73 and 73a are secured to the side frame 74 by means of angular brackets 75 and 76. Bracket 75 has parallel flanges 77 between which the end of the strap 73 is riveted or bolted. Bracket 76 has a depressed wall 78 against which a similarly shaped portion of the supported strap 73 is pressed by a pin 79.

In Figure 19, no special arms, brackets, or lugs are provided on the side frame. The vertically disposed central portion of the twisted strap 80 is bolted directly to the wall of the side frame 81, plates 82 being provided to brace the connection. This form of support is especially adapted for application to old trucks, it being necessary merely to drill two holes in the frames for the attaching bolts.

In each of the forms a substantial portion of the guard, guide or support device is vertically rigid and accordingly adapted to support the weight of the brake beam in case of hanger failure better than similar devices which are vertically resilient throughout their length. Furthermore, twisting of the resilient strap, as in Figures 1 to 8, and 19, facilitates offsetting the strap and permits a greater degree of offset than where the strap is bent edgewise, thus avoiding the necessity of providing an attaching arm on the side frame.

The invention is not limited to the details of the various forms shown but may be otherwise modified and the exclusive use of all such modifications as come within the scope of the appended claims is contemplated.

What is claimed is:

1. In a railway truck, a side frame element, and a brake beam guard, guide or support member including spaced vertically resilient portions disposed to underlie a pair of brake beams, and vertically rigid portions converging outwardly from said first mentioned portions and secured to said element.

2. In a railway truck, a side frame element, and a brake beam guard, guide or support member including a vertically resilient portion disposed to underlie the brake beam and a vertically rigid portion extending therefrom outwardly and longitudinally of the truck and secured to said element.

3. In a railway truck, a frame element, and a brake beam guard, guide or support member including a vertically rigid portion secured to said element and bent inwardly therefrom, and a vertically resilient portion at the end thereof disposed to underlie the brake beam.

4. In a railway truck, a side frame, and a brake beam guard, guide or support member projecting inwardly therefrom, said member including a strap-like portion secured to said frame and having its broader surfaces disposed vertically, and a similar portion positioned to underlie the brake beam and with its broader surfaces disposed horizontally.

5. In a railway truck, a side frame, and a one-piece brake beam guard, guide or support member projecting inwardly therefrom, said member having a vertically rigid portion secured to said frame, and a vertically resilient portion on the end thereof for underlying the brake beam.

6. In a railway truck, a side frame, and a resilient strap-like guard, guide or support member for a brake beam thereon, one portion of said member being secured to said frame and having its broader surfaces disposed vertically, and another portion underlying the brake beam and being twisted relative to said first-mentioned portion so that its broader surfaces are disposed horizontally.

7. In a railway truck, a side frame, and a resilient strap-like guard, guide or support member for a brake beam thereon, one portion of said member being secured to said frame and having its broader surfaces disposed vertically, and another portion being twisted relative to said first-mentioned portion so that its broader surfaces are disposed horizontally, said first-mentioned portion being bent inwardly to position said second-mentioned portion beneath the brake beam.

8. In a railway truck, a side frame element, and a brake beam guard, guide or support member and an additional brake beam safety guard thereon, said member having a vertically rigid portion secured to said element and a vertically resilient portion disposed to underlie the brake beam, and said safety guard being vertically rigid throughout its length.

9. In a railway truck, a side frame element, and a resilient brake beam guard, guide or support strap and an additional safety guard strap on said element, the portion of said guard, guide or support strap secured to said element having its broader surfaces disposed vertically and the portion thereof positioned to underlie the brake beam having its broader surfaces disposed horizontally, and said safety guard strap extending along said guard, guide or support strap and having its broader surfaces disposed vertically throughout its length.

10. In a railway truck, a side frame, and a brake beam guard, guide or support device having a member disposed to underlie the brake beam, a rigid member offset outwardly therefrom and secured to said frame, and a resilient element connecting said members.

11. In a railway truck, a side frame, and a brake beam guard, guide or support device having a rigid portion secured to said frame and projecting inwardly therefrom, a portion pivoted on said first-mentioned portion and underlying the brake beam, and a resilient element resisting rotation of said second-mentioned portion.

12. As a new article of manufacture, a brake beam guard, guide or support device comprising a flat strap-like member having end portions for underlying spaced brake beams, and an intermediate portion offset laterally from said end portions and twisted relative to said first-mentioned portion to rigidify the intermediate portion vertically and to facilitate its lateral offsetting and its application to the side of a truck frame.

13. As a new article of manufacture, a brake beam guard, guide or support device comprising a flat strap-like member twisted approximately 90° to provide a horizontally flat yielding portion for supporting a brake beam and to provide a vertically flat rigid portion for attachment to a supporting element.

EDWIN G. BUSSE.